US006832424B2

United States Patent
Brown et al.

(10) Patent No.: US 6,832,424 B2
(45) Date of Patent: Dec. 21, 2004

(54) SYMMETRICAL MILL

(75) Inventors: Peter Brown, Altona Meadows (AU); Tony Backhouse, Richmond (AU)

(73) Assignee: Self Leveling Machines, Inc., The Woodlands, TX (US)

( * ) Notice: Subject to any disclaimer, the term of this patent is extended or adjusted under 35 U.S.C. 154(b) by 0 days.

(21) Appl. No.: 10/828,047

(22) Filed: Apr. 20, 2004

(65) Prior Publication Data

US 2004/0197157 A1 Oct. 7, 2004

Related U.S. Application Data

(62) Division of application No. 10/187,271, filed on Jul. 8, 2002.
(60) Provisional application No. 60/304,059, filed on Jul. 10, 2001.

(51) Int. Cl.$^7$ .............................. B23P 6/00; B23C 3/00; B23C 1/20
(52) U.S. Cl. ...................... 29/402.19; 29/558; 409/178; 409/230
(58) Field of Search ...................... 29/402.01, 402.19, 29/557, 558; 409/178, 230, 202, 212, 175, 183, 192, 203, 204, 206, 211, 213, 217, 144

(56) References Cited

U.S. PATENT DOCUMENTS

| | | | |
|---|---|---|---|
| 1,618,942 A | | 2/1927 | O'Brien et al. |
| 2,195,064 A | | 3/1940 | Wallace |
| 2,934,862 A | | 5/1960 | Fechter |
| 3,430,400 A | | 3/1969 | Parrella et al. |
| 3,456,400 A | | 7/1969 | Lessmann et al. |
| 3,460,435 A | * | 8/1969 | Dahl et al. ................... 409/230 |
| 3,469,353 A | | 9/1969 | Klein |
| 3,476,161 A | * | 11/1969 | Dunlap ........................ 409/178 |
| 3,653,162 A | | 4/1972 | Clark, Jr. |
| 3,660,859 A | * | 5/1972 | McCullough ............... 409/178 |
| 3,664,066 A | | 5/1972 | Clark, Jr. |
| 3,703,057 A | | 11/1972 | Krausz et al. |
| 3,935,788 A | * | 2/1976 | Gilmore ...................... 409/178 |
| 4,022,106 A | * | 5/1977 | Kile ............................ 409/178 |
| 4,190,390 A | | 2/1980 | Yeates et al. |
| 4,292,494 A | | 9/1981 | Trishevsky et al. |
| 4,484,959 A | | 11/1984 | Boucher et al. |
| 4,509,295 A | | 4/1985 | Böttcher et al. |
| 4,575,972 A | | 3/1986 | Ohki et al. |
| 4,619,080 A | | 10/1986 | Okamoto et al. |
| 4,671,017 A | | 6/1987 | Ideue et al. |
| 4,716,687 A | | 1/1988 | Tsukamoto et al. |
| 4,787,786 A | * | 11/1988 | Freud et al. ................ 409/178 |
| 4,813,259 A | | 3/1989 | Grocock et al. |
| 4,827,751 A | | 5/1989 | Holthoff |
| 4,930,380 A | | 6/1990 | Sasaki et al. |
| 4,987,668 A | * | 1/1991 | Roesch ....................... 409/212 |
| 5,035,086 A | | 7/1991 | Katsuki et al. |
| 5,106,243 A | * | 4/1992 | Hunt .......................... 409/178 |
| 5,385,436 A | * | 1/1995 | Corsi .......................... 409/230 |
| 5,592,728 A | * | 1/1997 | Susnjara ..................... 409/212 |
| 5,738,570 A | | 4/1998 | Rosenthal et al. |
| 5,957,756 A | | 9/1999 | Figge et al. |
| 6,067,695 A | * | 5/2000 | Momoitio ................... 409/202 |
| 6,068,431 A | * | 5/2000 | Line ........................... 409/202 |
| 6,334,745 B1 | * | 1/2002 | Bennett, Sr. ................ 409/191 |

* cited by examiner

*Primary Examiner*—Erica Cadugan
(74) *Attorney, Agent, or Firm*—Haynes and Boone LLP; Todd Mattingly

(57) ABSTRACT

An apparatus and method for in-situ milling includes a support and a pair of spaced apart rails attached to the support. The support and rails are mounted between a pair of opposed mill housing wear plate surfaces. A milling assembly is reversibly mounted on the rails in either of a first orientation and a second orientation. In the first orientation, the milling assembly mills one of the wear plate surfaces. The milling assembly is reverse mounted on the rails to the second orientation for milling the other of the wear plate surfaces. This permits the support and the rails to remain in one position between the wear plate surfaces requiring only the milling assembly to be moved to accomplish milling of each of the wear plate surfaces.

6 Claims, 9 Drawing Sheets

SYMMETRICAL MILL

BACKGROUND

This application is a division of U.S. patent application Ser. No. 10/187,271, filed on Jul. 8, 2002, which claimed the benefit of an earlier filed provisional application Ser. No. 60/304,059 filed Jul. 10, 2001, which is incorporated herein by reference in its entirety.

The disclosures herein relate generally to metal processing and more particularly to resurfacing the wear plate surfaces on a mill stand.

In the production of metal such as sheet steel and sheet aluminum, the metal is processed through a series of mill stands. Each stand includes rollers. The metal sheet is progressively reduced in thickness as it passes through sequential sets of rollers causing a substantial amount of impact and wear on the rollers and the supporting mill stands.

Wear plates or liners are mounted on the mill stand to limit wear to the opposed/vertical wear plate surfaces of the mill housing which supports the rollers. The wear plates are routinely replaced due to pounding and corrosion caused by the rolling process.

The housings also become worn and eventually must be refurbished. This requires a resurfacing operation on the surface of the housing which supports the wear plates. The resurfacing requires in-situ milling operations which results in production downtime. Traditionally, about 140 hours of downtime is required to complete these milling operations.

Therefore, what is needed is an in-situ milling operation which accomplishes the required resurfacing and substantially reduces the production downtime presently associated with traditional resurfacing.

SUMMARY

One embodiment, accordingly, provides an apparatus for in-situ milling including a support. A milling assembly is reversibly mounted on the support in either of a first orientation and a second orientation, opposite the first orientation. The milling assembly is movable in a first direction and includes a cutting head movable in a second direction, perpendicular to the first direction.

A principal advantage of this embodiment is that in the first orientation, a first wear plate surface is milled. The milling assembly is then reverse mounted to the second orientation so that the opposed wear plate surface can be milled while the support remains in one position.

DETAILED DESCRIPTION

Figure 1:
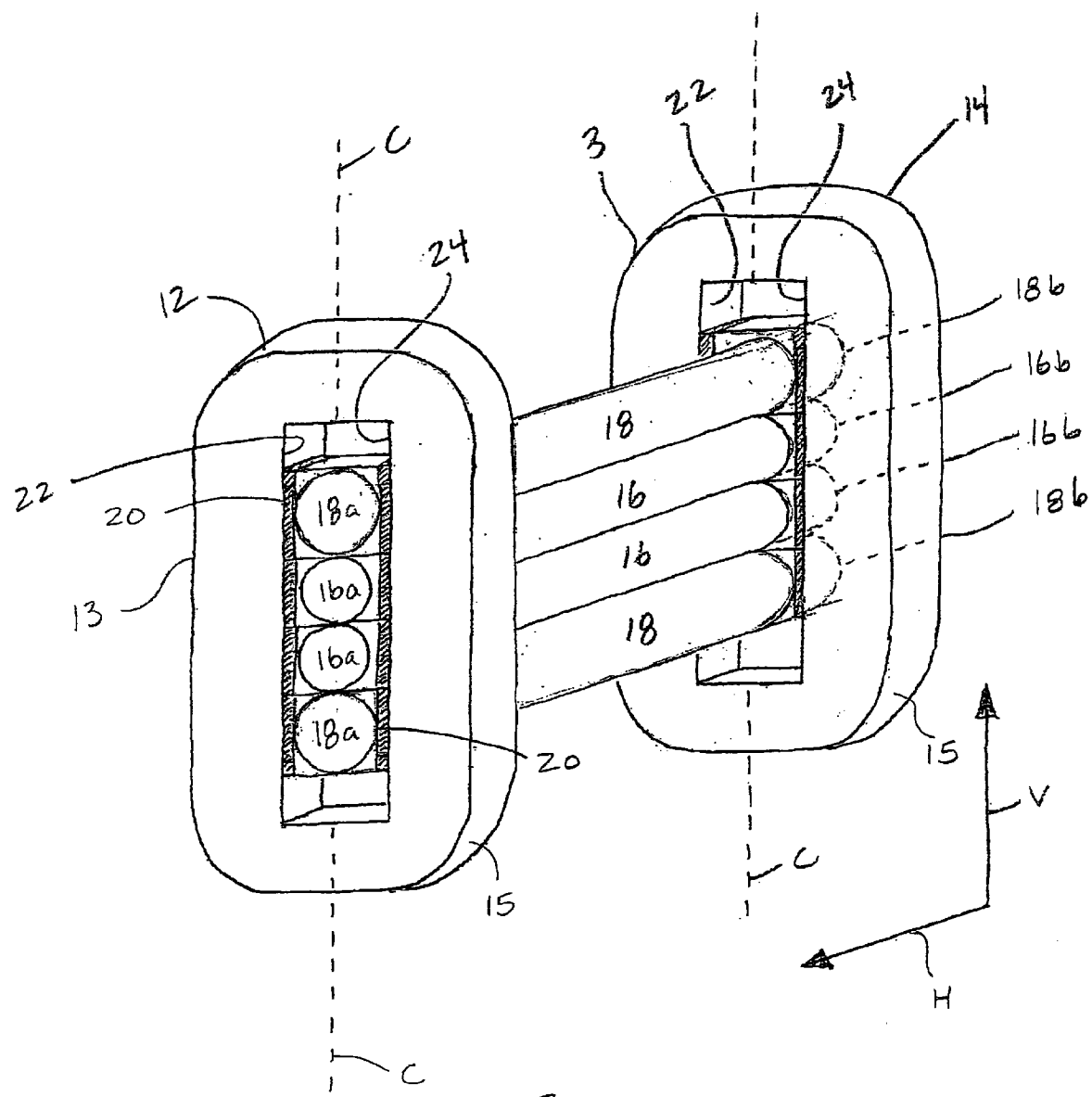
FIG. 1 is a perspective view illustrating an embodiment of a mill stand.
Figure 2:
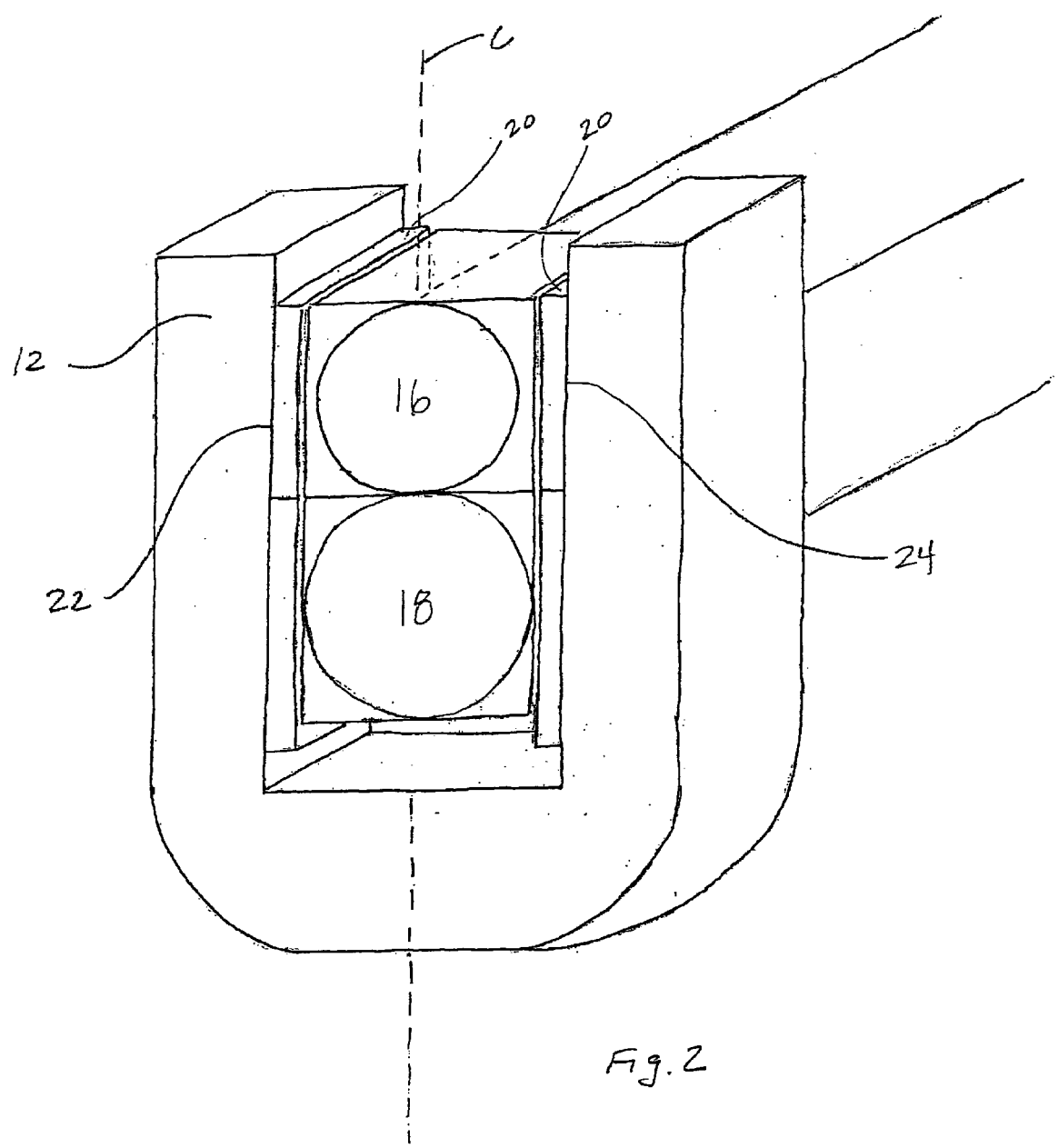
FIG. 2 is a partial perspective view illustrating an embodiment of a mill housing.

A mill stand 10, FIGS. 1 and 2, comprises a pair of side-by-side mill stand housings 12 and 14. Housing 12 supports a first end 16a of a pair of work rolls 16, and a first end 18a of a pair of back-up rolls 18. Housing 14, supports a second end 16b of work rolls 16 and a second end 18b of back-up rolls 18. The rolls 16 and 18 are mounted to rotate relative to a centerline C. Each housing 12, 14 includes an intake side 13 and an exit side 15. In FIG. 1, and others, a horizontal directional reference H and a vertical directional reference V, are provided.

Each housing 12 and 14 includes a pair of opposed wear plate surfaces 22, 24. Wear plates 20 are mounted between the bearing mounted rolls 16, 18 and the wear plate surfaces 22, 24 during rolling operations. Surfaces 22, 24 are equidistant from centerline C. When surfaces 22, 24 are in need of milling (re-surfacing) the wear plates 20 and the rolls 16, 18 are removed.

Figure 3:
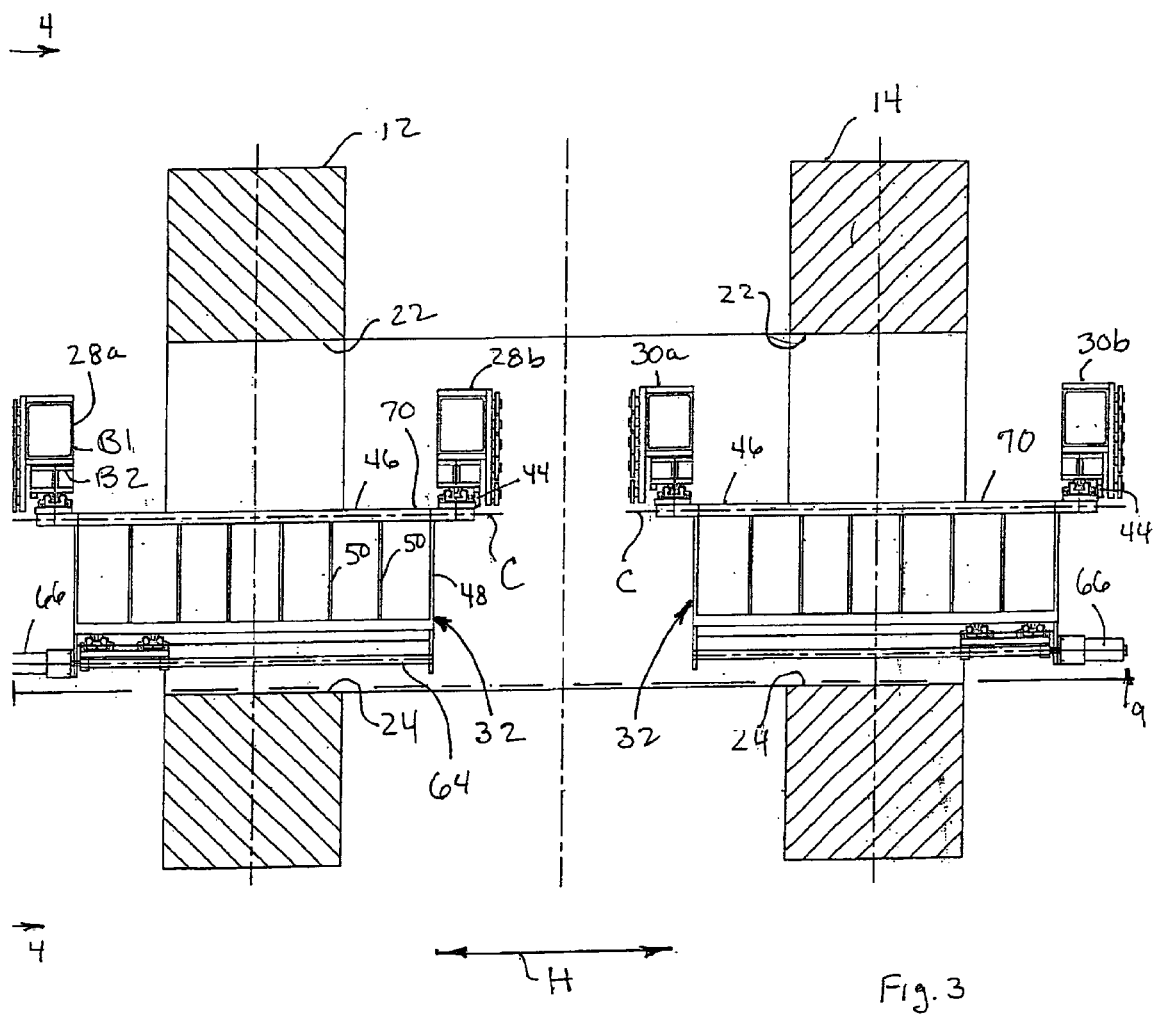
FIG. 3 is a cross-sectional top view illustrating an embodiment of an apparatus for in-situ milling in one orientation.
Figure 4:
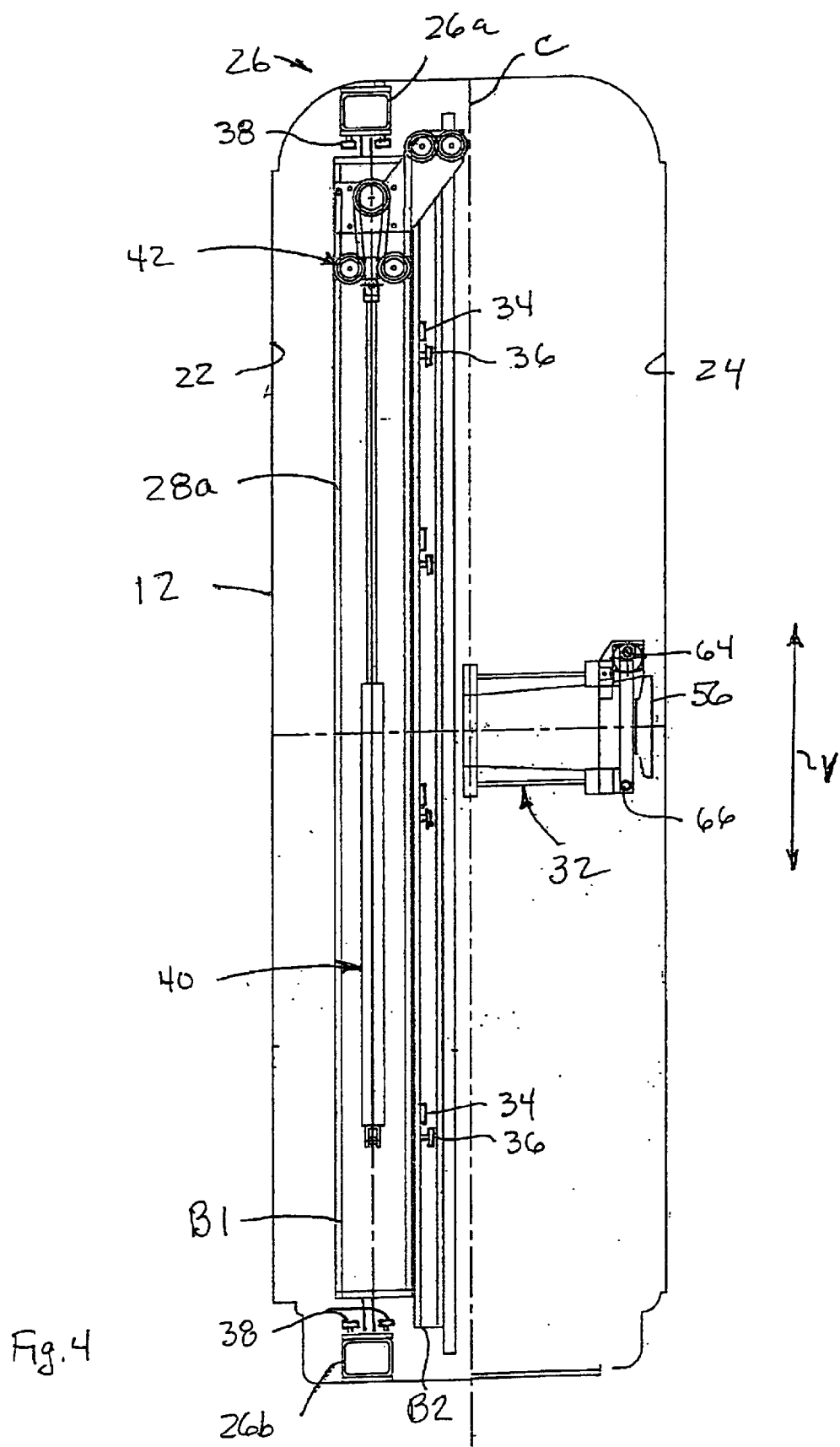
FIG. 4 is an elevational view taken along line 4—4 of FIG. 3.

When the wear plate surfaces 22, 24 are milled true to the centerline C, a support 26, FIGS. 3 and 4, is provided between the wear plate surfaces 22, 24. The support 26 includes a pair of vertically spaced apart beams 26a and 26b. A first pair of horizontally spaced apart rails 28a and 28b are attached to support 26 adjacent housing 12, and a second pair of horizontally spaced apart rails 30a and 30b are attached to support 26 adjacent housing 14. In this manner, the rails are positioned between the opposed wear plate surfaces 22, 24.

Each pair of rails 28a, 28b and 30a, 30b, FIGS. 3 and 4, also includes a milling assembly 32 mounted thereon. Because each pair of rails and each milling assembly 32 are alike, only one will be described in the following detail along with the respective rails.

Each rail, for example rail 28a, FIGS. 3 and 4, includes a first beam B1 having a square cross-section and a second beam B2 having an I cross-section. Beams B1 and B2 are attached by a plurality of suitable fasteners 34. Also a plurality of adjustable members 36 are mounted in beam B2 and are engaged against beam B1 so that beam B2 can be jacked and adjusted for flatness relative to centerline C. In addition, another plurality of adjustable members 38 are provided between beam B1 and each support 26a, 26b so that each rail (see rail 28a in FIG. 4) can be adjusted true to the centerline C. The adjustable members 38 and 36 respectfully provide a primary and secondary means of adjustment to assure a true and flat milled surface.

Milling assembly 32 is movably mounted on rails 28a, 28b and 30a, 30b. Movement of milling assembly 32 is in a vertical direction V. To assist in such movement, a hydraulic counterbalance 40 is provided along with a pulley system 42 to assist a rack and pinion drive 44 of the milling assembly 32 in bi-directional vertical motion V.

Each milling assembly 32 is alike and therefore, only one will be described in the following detail. Each milling assembly 32, FIGS. 3 and 4, includes a cross member 46 which moves vertically on the rails 28a, 28b, as described above, in response to actuation of the rack and pinion drive 44. Cross-member 46 includes a fabricated frame 48 reinforced with a plurality of gussets 50. An elongated opening 52, FIGS. 5A and 5B, formed in cross-member 46 permits movement of a milling cutter 54 in horizontal direction H.

Figure 5:
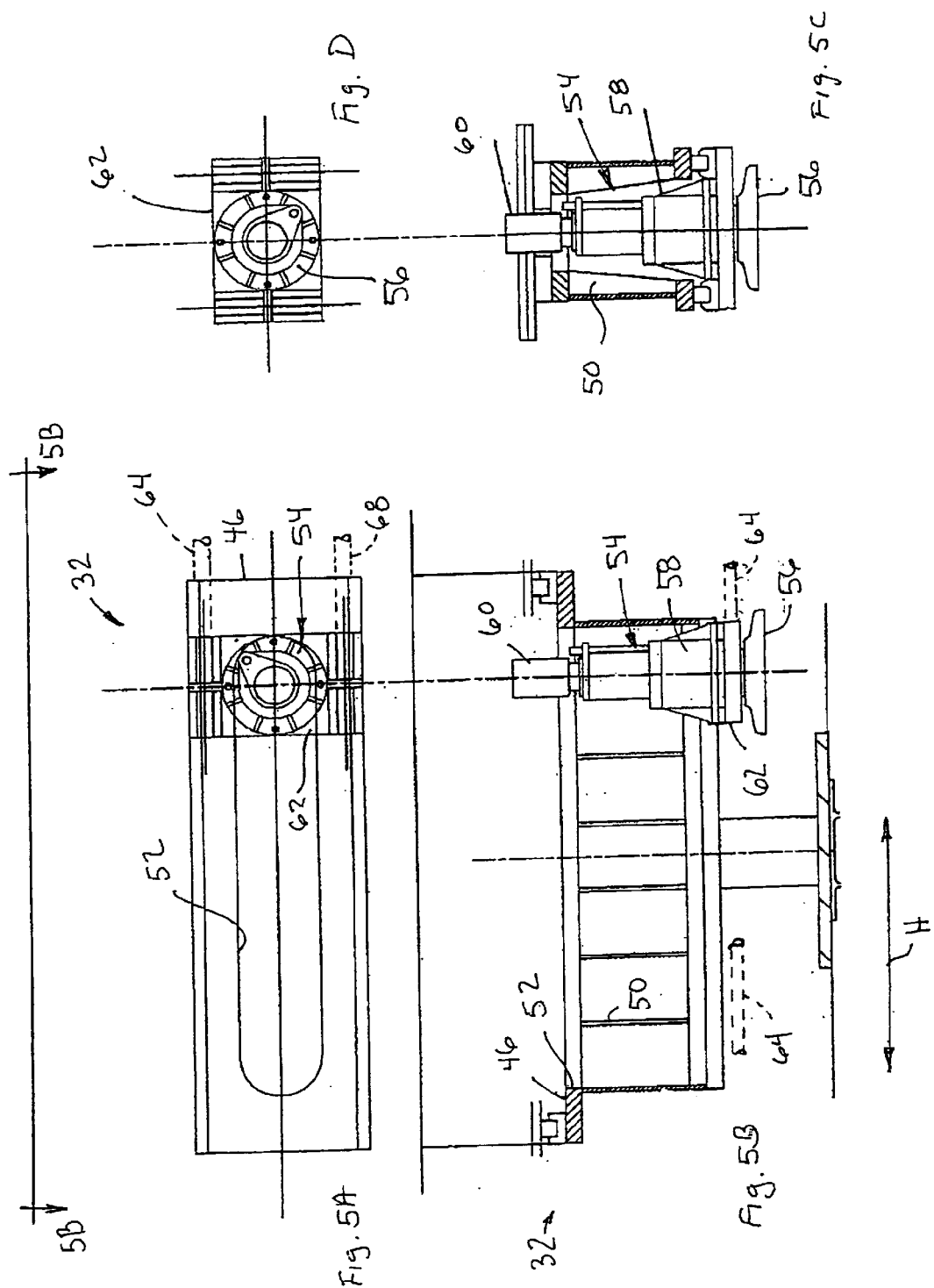
FIG. 5A is a frontal view illustrating an embodiment of a milling assembly.
FIG. 5B is a top view taken along the line 5B—5B of FIG. 5A.
FIGS. 5C and 5D are more detailed views illustrating an embodiment of a milling cutter.

Milling cutter 54 includes a cutting head 56, a quill housing 58 and a drive motor 60, see also FIGS. 5C and 5D.

Figure 6:
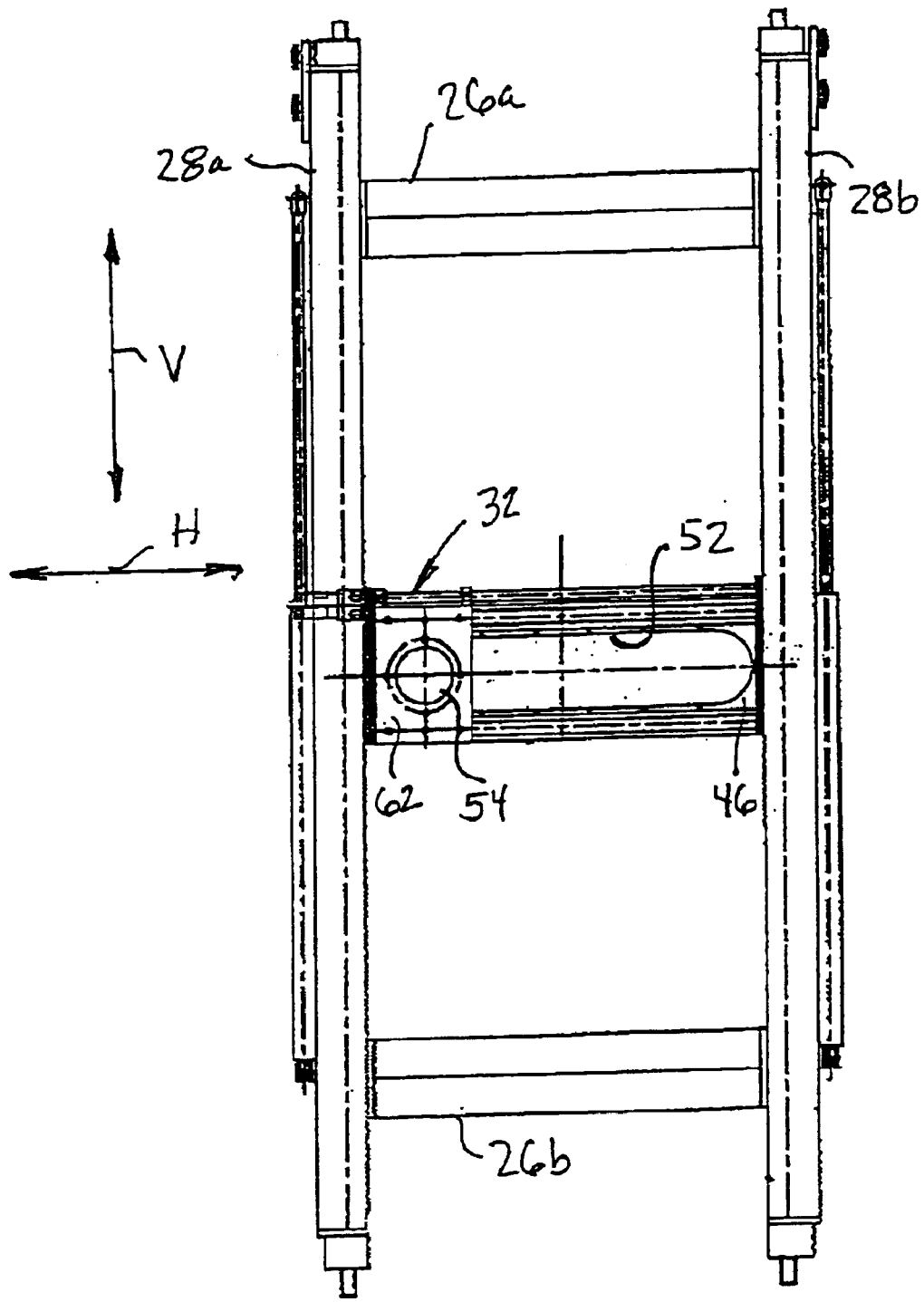
FIG. 6 is an elevational view illustrating a portion of an in-situ milling apparatus according to one embodiment.

Milling cutter 54 is supported on a movable plate 62. Plate 62 is mounted on a screw drive member 64, FIGS. 3, 4, 5A and 5B, and is driven in the horizontal direction H by a drive motor 66. Plate 62 also moves on a guide rod 68 which extends parallel to screw drive member 64. In another view, FIG. 6, milling assembly 32 is illustrated on rails 28a, 28b along with directional arrows illustrating the vertical component V of movement of plate 46 relative to rails 28a, 28b. The milling cutter 54 and the plate 62, move horizontally in slot 52 relative to the vertically movable plate 46.

In FIGS. 3 and 4, milling cutters 54 are illustrated in a first orientation, i.e. positioned to mill surfaces 24. This is accomplished by movably attaching respective plates 46 to rails 28a, 28b, and 30a, 30b for the vertical movement V discussed above. In this orientation, the milling assemblies are mounted so that a first surface 70 of each plate 46 is respectively attached to rails 28a, 28b and 30a, 30b. As a result, milling assemblies 32 extend away from rails 28a, 28b, and 30a, 30b and toward mill surfaces 24.

Figure 7:
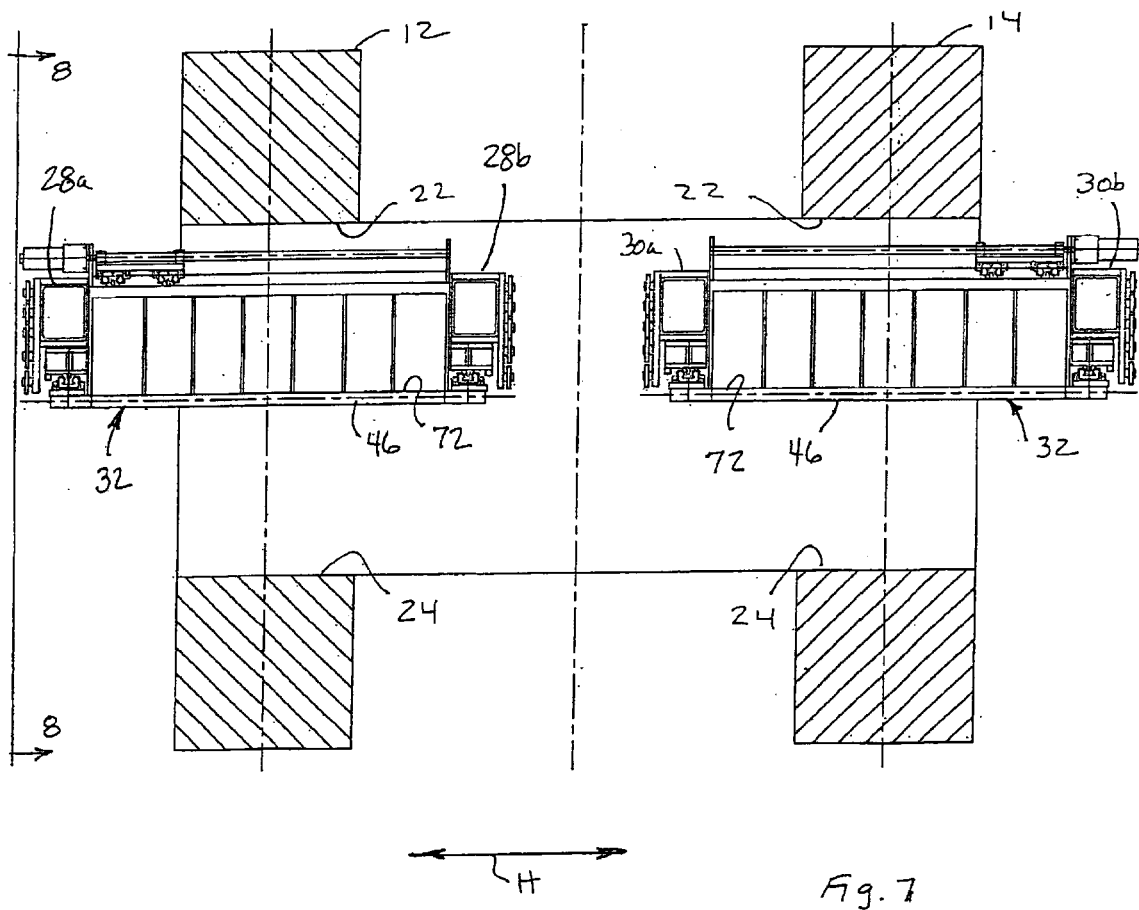
FIG. 7 is a cross-sectional top view illustrating an embodiment of an apparatus for in-situ milling in another orientation.
Figure 8:
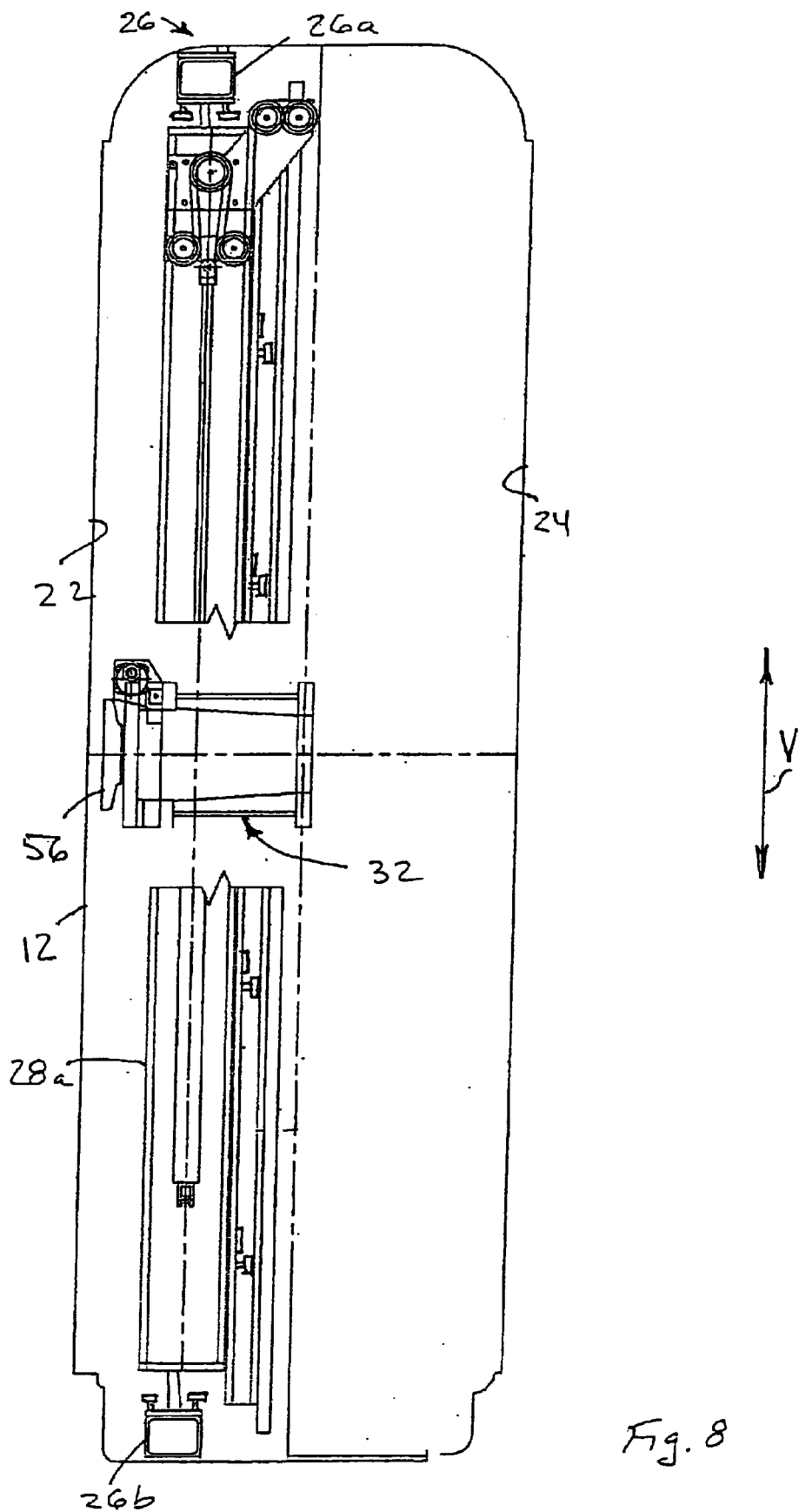
FIG. 8 is an elevational view taken along the line 8—8 of FIG. 7.

When it is desired to mill surfaces 22, FIGS. 7 and 8, the milling assemblies 32 are removed from support 26 and re-mounted to rails 28a, 28b and 30a, 30b in a second orientation, i.e. positioned to mill surfaces 22. This is accomplished by movably attaching a second surface 72 of respective plates 46 to rails 28a, 28b, and 30a, 30b. As a result, one milling assembly 32 extends between the rails 28a, 28b and toward one mill surface 22 and the other milling assembly 32 extends between the rails 30a, 30b and toward other mill surface 22. It should be noted that, as illustrated in FIG. 7, both of the milling assemblies 32 are reverse-mounted for milling the respective mill surfaces 22 of mill housings 12 and 14. This is typically accomplished at the same time, however, the two milling assemblies 32 are independently reversible if this is desired. Thus, for example, it would be possible to mount one of the milling assemblies 32 oriented toward its respective milling surface 22, and mount the other of the milling assemblies 32 oriented toward its respective milling surface 24. Note that the support 26 and each set of rails 28a, 28b and 30a, 30b remain stationary while only the milling assemblies 32 require movement and re-orientation.

Figure 9:
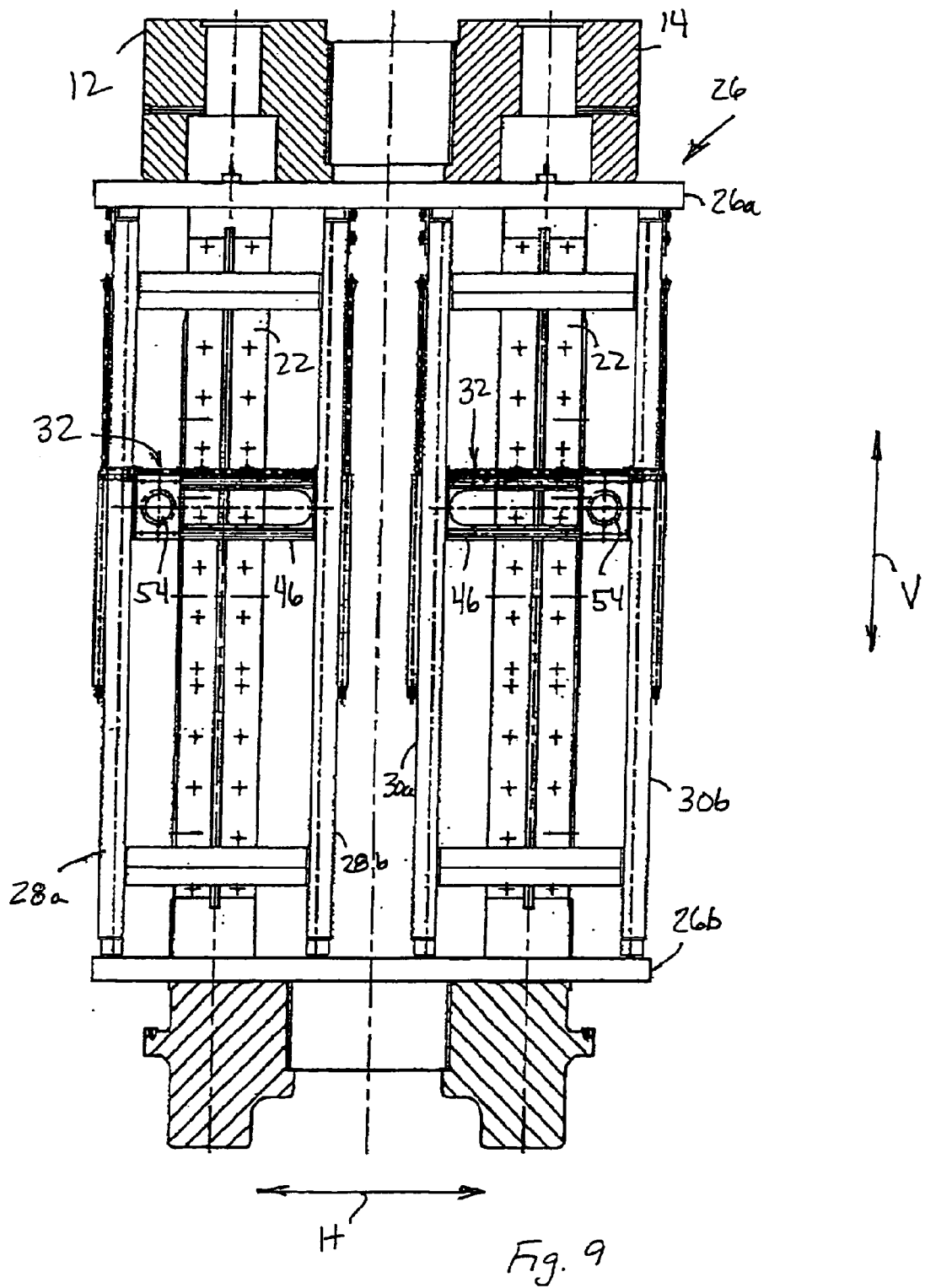
FIG. 9 is a cross-sectional frontal view taken along the line 9—9 of FIG. 3.

In FIG. 9, support 26 is illustrated along with rails 28a, 28b and 30a, 30b. Each set of rails includes milling assembly 32 which is vertically movable thereon. Each milling assembly 32 includes cutting head 56 which is horizontally movable. One of the milling assemblies 32 is adjacent housing 12 and the other milling cutter 32 is adjacent housing 14. Mill surfaces 22 are also illustrated.

As can be seen, the principal advantage of this embodiment is that the support and rails are positioned between the wear plate surfaces. The milling assembly is mounted on the rails to extend toward one of the milling surfaces for milling the one surface. The milling assembly is then reverse mounted on the rails to extend toward the other milling surface for milling the other surface while the support and rails remain in one position.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in the manner consistent with the scope of the embodiments disclosed herein.

What is claimed is:

1. A method for in-situ milling comprising:

providing a support;

attaching a pair of spaced apart rails to the support;

movably mounting a cross member on and extending perpendicular to the rails in a first orientation;

movably mounting a cutting head on the cross member;

performing a first cutting operation with the cross member in the first orientation;

removing the cross member from the rails;

movably mounting the cross member on and extending perpendicular to the rails in a second orientation, reciprocal to the first orientation; and performing a second cutting operation with the cross member in the second orientation.

2. A method for in-situ milling a mill housing comprising:

providing a support;

attaching a pair of spaced apart rails to the support;

movably mounting a cross member on and extending perpendicular to the rails in a first orientation;

movably mounting a cutting head on the cross member;

providing a mill housing including a pair of opposed wear plate surfaces;

positioning the support between the wear plate surfaces so that the cutting head extends toward a first one of the wear plate surfaces;

performing a first cutting operation on the first wear plate surface with the cross member in the first orientation;

removing the cross member from the rails;

movably mounting the cross member on and extending perpendicular to the rails in a second orientation, reciprocal to the first orientation so that the cutting head extends toward a second one of the wear plate surfaces; and performing a second cutting operation on the second wear plate surface with the cross member in the second orientation.

3. A method for in-situ milling a mill housing comprising:

providing a mill housing including a pair of opposed wear plate surfaces equidistant from a centerline;

mounting a support between the wear plate surfaces;

attaching a pair of spaced apart rails to the support;

mounting a movable milling assembly on the rails including a movable cutting head extending toward one of the wear plate surfaces;

performing a first cutting operation on one of the wear plate surfaces;

removing the milling assembly from the rails;

mounting the milling assembly on the rails so that the cutting head extends toward the other of the wear plate surfaces; and performing a second cutting operation on the other of the wear plate surfaces.

4. The method of claim 3 wherein the rails include a first beam of a first cross-section connected to a second beam of a second cross-section, different from the first cross-section.

5. The method of claim 4 further comprising:

providing a primary means for adjusting alignment of the rails true to the centerline.

6. The method of claim 5 further comprising:

providing a secondary means for adjusting alignment of the second beam true to the centerline.

* * * * *